United States Patent [19]

Lyon et al.

[11] 4,407,192

[45] Oct. 4, 1983

[54] MARKING MEANS FOR HOSE COUPLING EXPANSION ATTACHMENT MACHINE

[75] Inventors: Lyndall W. Lyon; Phillip G. Reneau; Paul G. Coppock, all of Battle Creek, Mich.

[73] Assignee: The Citation-Walther Corporation, Grand Rapids, Mich.

[21] Appl. No.: 314,189

[22] Filed: Oct. 23, 1981

[51] Int. Cl.³ .......................... B23P 19/04; B44B 5/00

[52] U.S. Cl. ............................................ 101/7; 29/237

[58] Field of Search .................... 101/7, 5, 4, 6, 8, 28, 101/38 R; 29/237, 507

[56] References Cited

U.S. PATENT DOCUMENTS

| | | | |
|---|---|---|---|
| 741,915 | 10/1903 | Kirschbaum | 101/4 |
| 1,551,376 | 8/1925 | Duchemin | 101/7 |
| 1,892,545 | 12/1932 | Ward | 101/7 |
| 2,420,613 | 5/1947 | Nord | 101/4 |
| 2,610,576 | 9/1952 | Norris | 101/7 |
| 2,822,852 | 2/1958 | Bailey | 29/237 |
| 3,022,725 | 2/1962 | Mathiason et al. | 101/40 |
| 3,053,172 | 9/1962 | King | 101/7 |
| 3,330,023 | 7/1967 | Frye et al. | 29/507 X |
| 3,348,292 | 10/1967 | Turner et al. | 29/237 |
| 3,577,701 | 5/1971 | Bott et al. | 53/131 |
| 3,675,913 | 7/1972 | Warsager | 269/51 |
| 3,768,401 | 10/1973 | Sahm et al. | 101/4 |
| 3,886,860 | 6/1975 | Hawakawa | 101/4 |
| 4,126,936 | 11/1978 | Koller | 101/4 X |
| 4,179,988 | 12/1979 | Rath | 101/7 |
| 4,269,090 | 5/1981 | Ingber et al. | 101/4 X |

FOREIGN PATENT DOCUMENTS

| | | | |
|---|---|---|---|
| 142851 | 7/1980 | German Democratic Rep. | 101/7 |

*Primary Examiner*—Clifford D. Crowder
*Attorney, Agent, or Firm*—Waters, Lesniak & Willey

[57] ABSTRACT

A marking means for a hose coupling expansion attachment machine automatically provides desired markings on the female hose coupled simultaneously with attaching it to a particular hose section. The marking means which is mounted on the front of the machine adjacent to the expanding means is in marking alignment with the curved periphery of the rotatable female external end section of a hose coupling. The marking means is linearly moveable between a nonmarking position and a marking engagement position so that as the marking means passes into and through the marking position, the female and section will be rotated to provide the desired marking on the curved periphery of the female end section. Rigid hollow circular cylindrical stamp arbors are utilized to prevent deformation of the hose couplings, and two or more expanding means stations can be utilized for either male or female couplings, or both, with only the female couplings being marked.

4 Claims, 5 Drawing Figures

MARKING MEANS FOR HOSE COUPLING EXPANSION ATTACHMENT MACHINE

BACKGROUND OF THE INVENTION

1. Field of the Invention

The present invention relates to hose coupling expansion attachment machines, and, more particularly, to a marking means for such a machine.

2. Description of the Prior Art

In the field of manufacturing hoses, such as garden hoses and the like, metal male and female hose couplings are attached to the ends of rubber or vinyl hoses. Most commonly, the attachment is accomplished by providing an outside ferrule at the end of the hose and a circular cylindrical end to the coupling which is received in the end of the hose and which is expanded internally outwardly to attach the coupling to the hose end by sandwiching it between the inside coupling end and the outside ferrule. Generally, a male coupling is provided on one end of a hose and a female coupling is provided on the other end of the hose.

Because of the difficulty in marking the hose itself, product identification markings are generally made on the outer periphery of the female hose coupling, or the ferrule, such as identification number, diameter, length, etc. Heretofore, these markings have been made on the hose coupling before attachment to a particular hose section. Since hose manufacturers generally purchase the hose couplings from outside suppliers, this has caused the hose manufacturers to have to inventory a variety of marked couplings and to expend the time and effort to match particular marked couplings with the appropriate hoses.

Accordingly, it would be desirable if the hose manufacturer could stock blank hose couplings and economically mark each hose coupling simultaneously with attachment to a particular hose to thereby eliminate the current inventory and handling problems.

SUMMARY OF THE INVENTION

According to the present invention there is provided a marking means for a hose coupling expansion attachment machine which automatically provides desired markings on the female hose coupling simultaneously with attaching it to a particular hose section. The marking means is mounted on the front of the coupling expansion attachment machine adjacent to the expanding means so as to be in marking alignment with the curved periphery of the rotatable female external end section of a hose coupling. The marking means is linearly moveable between a non-marking position and a marking engagement position so that as the marking means passes into and through the marking position, the female end section will be rotated to provide the desired marking on the curved periphery of the female end section.

Preferably, the marking means comprises a linearly moveable stamp arm having a marking stamp rigidly mounted thereon and means for linearly moving the stamp arm when the expansion machine is actuated. Also preferably, the machine includes a rigid hollow circular cylindrical stamp arbor around the machine expanding means sized to be received in the female external end of the hose coupling to prevent deformation of the female external end when the marking stamp passes through the marking engagement position, as well as facilitating rotation of the female rotatable end and preventing bending or breaking of the expansion means.

The expansion machine cam also include two or more expanding means stations to, for example, attach a male and a female hose coupling simultaneously to each end of a hose, while providing the desired markings on the female coupling. In addition, the preferred stamp arbor can be spring biased to be moveable toward the machine so as to be usable for expanding male couplings for attachment to hose ends without providing markings on the male coupling. In such a case, the marking means will pass through its marking engagement position without marking the male coupling because of the smaller diameter of the male coupling as compared to the diameter of the female coupling.

DESCRIPTION OF THE PREFERRED EMBODIMENTS

Figure 1:
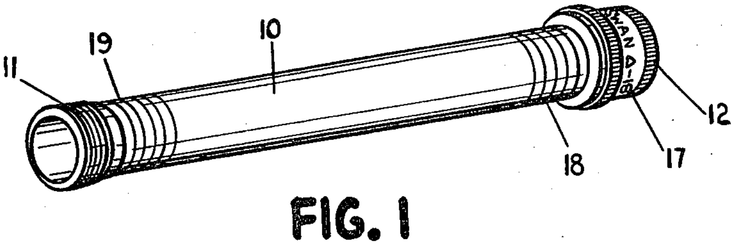
FIG. 1 is a perspective view of a hose with male and female couplings attached.
Figure 2:
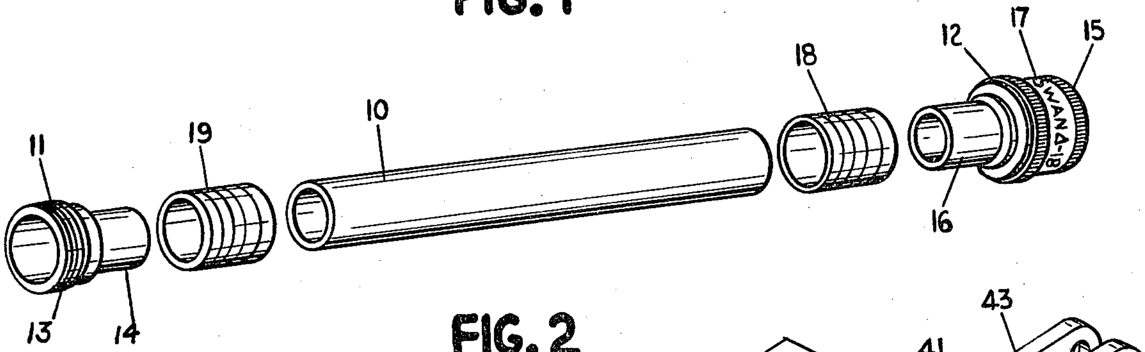
FIG. 2 is an exploded perspective view of the hose assembly of FIG. 1.
Figure 3:
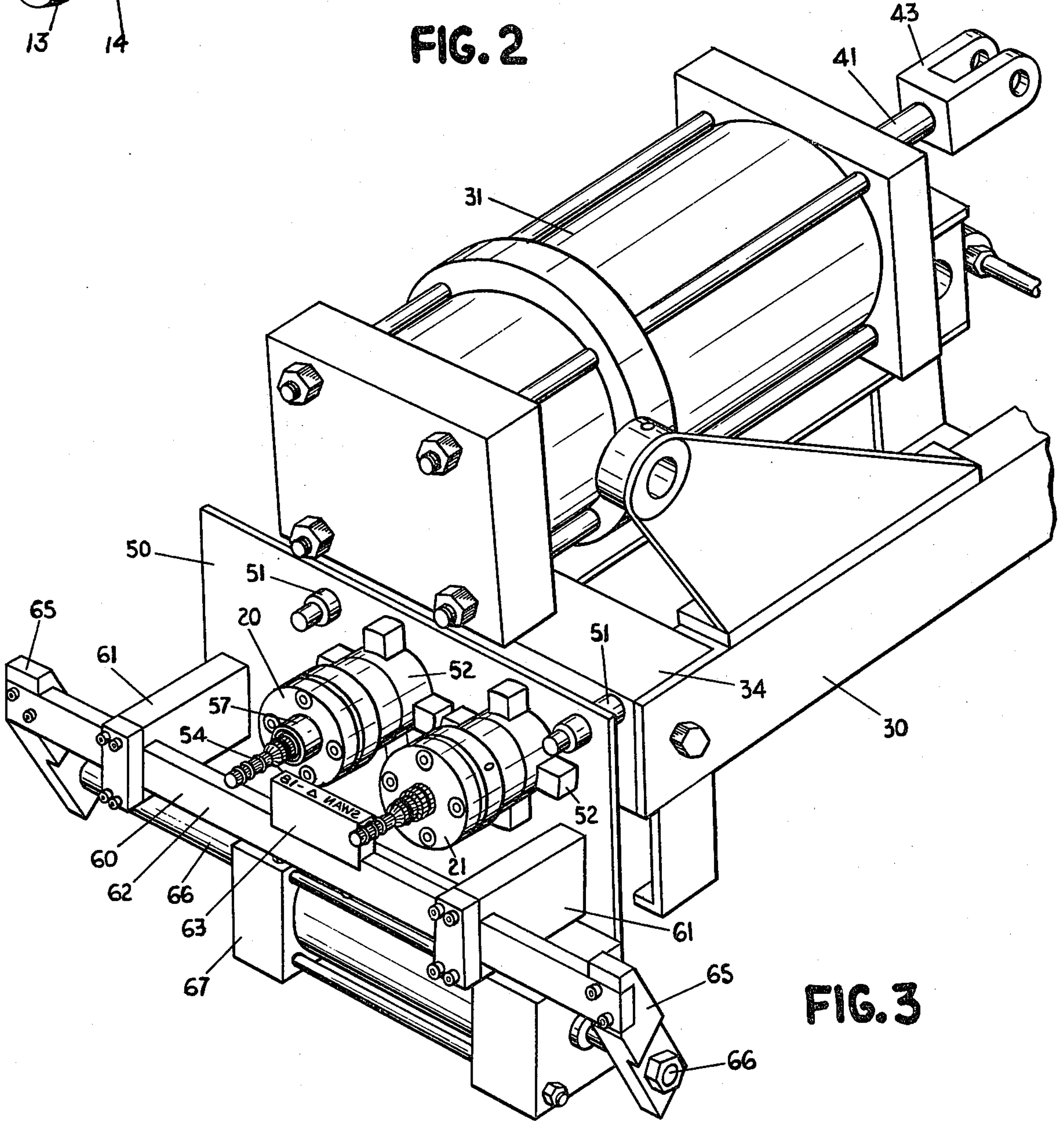
FIG. 3 is a perspective view of a hose coupling expansion attachment machine with the unique marking means mounted on the front thereof.
Figure 4:
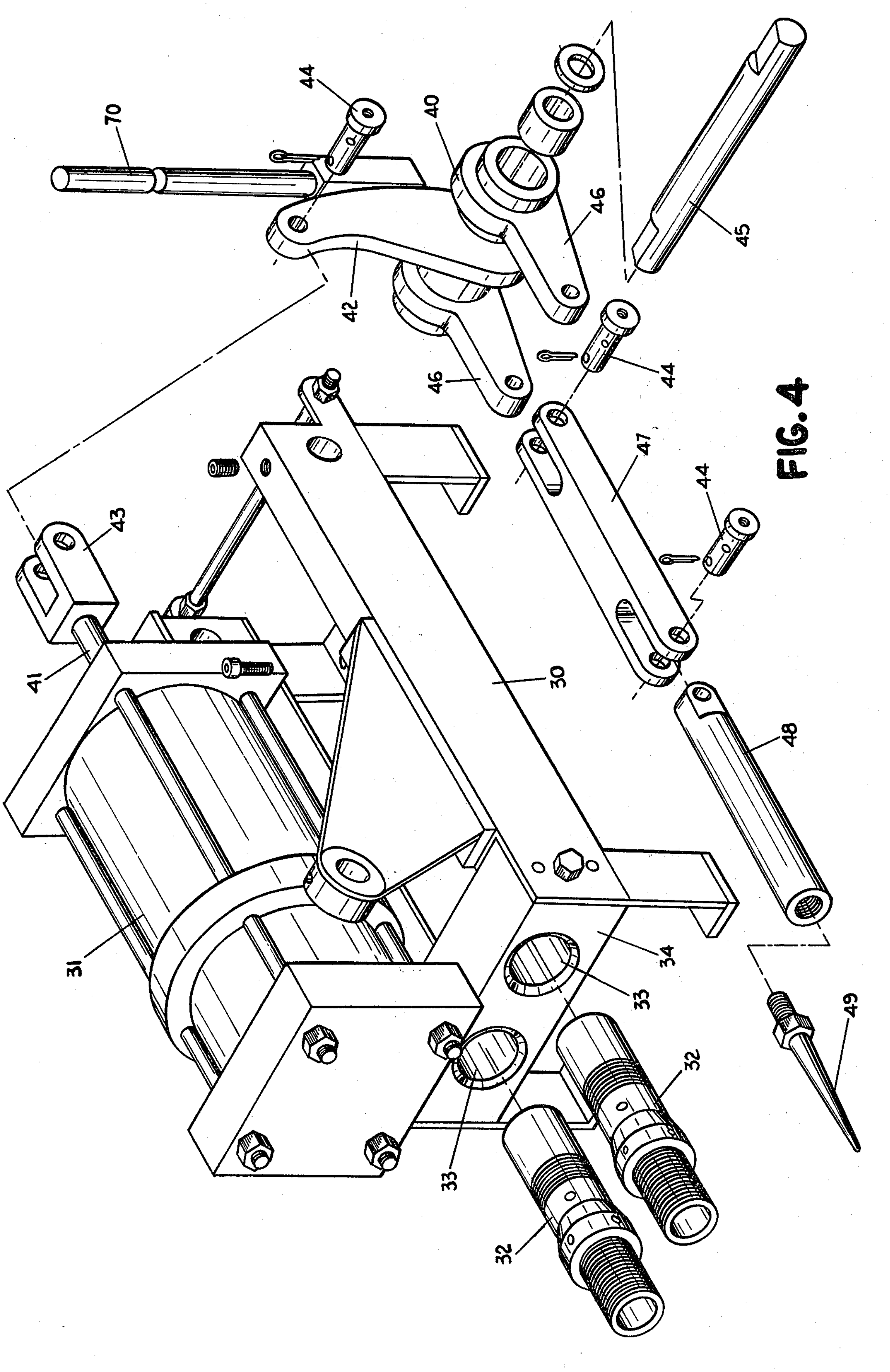
FIG. 4 is a partially exploded view of the rear portion of the expansion machine of FIG. 3.
Figure 5:
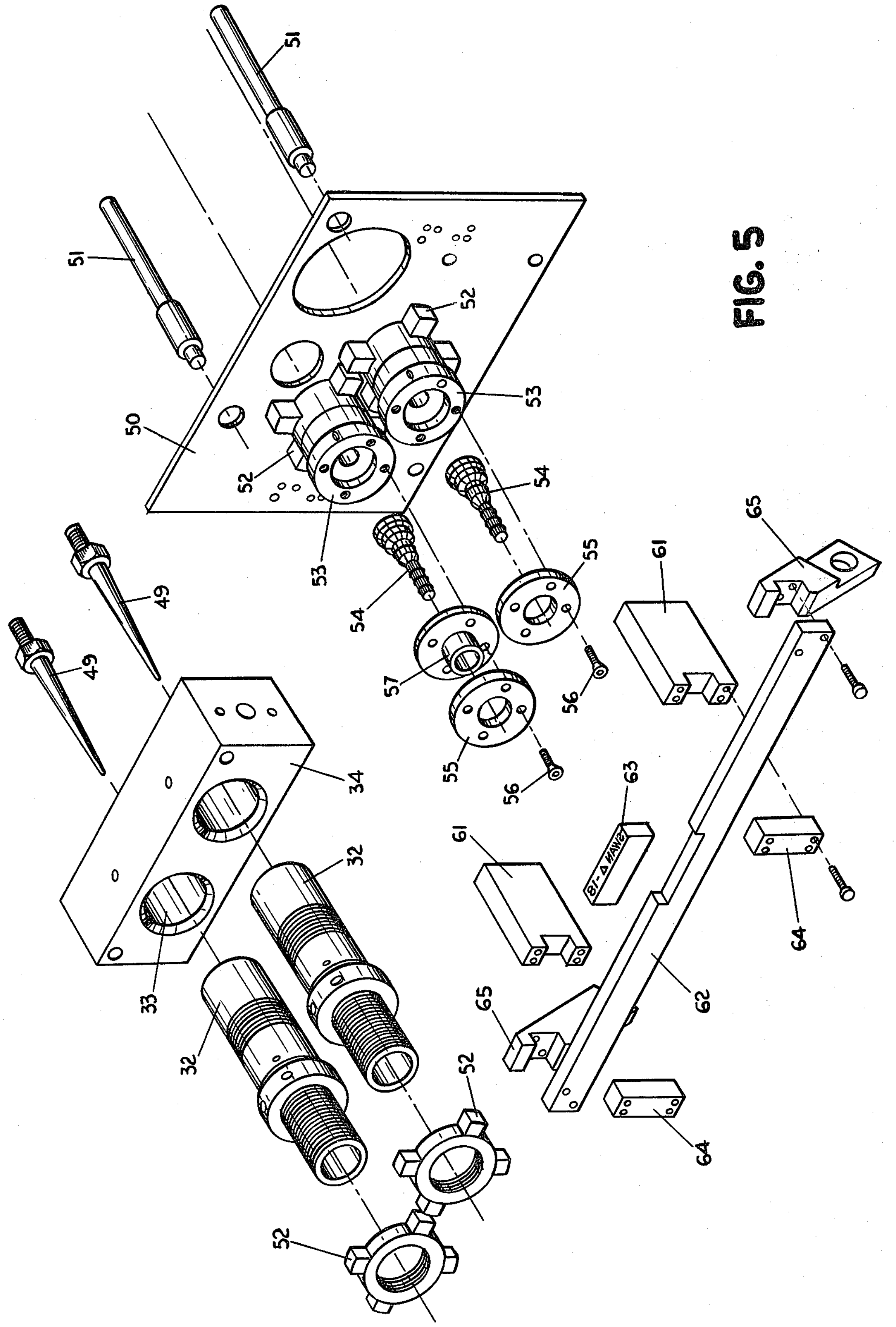
FIG. 5 is an exploded perspective view of the front portion of the expansion machine of FIG. 3 and the unique marking means attachment.

Referring to the drawings in greater detail, a hose coupling assembly is shown in FIG. 1. The assembly includes hose 10 with male hose coupling 11 and ferrule 19 attached at one end, and female hose coupling 12 and ferrule 18 attached at the other end. The construction of the hose couplings is shown in the exploded view in FIG. 1. Male coupling 11 includes an external threaded portion 13 and an internal expanding portion 14. Female coupling 12 includes rotatable external circular cylindrical end section 15 and an expandable internal section 16. Identification markings 17 are shown stamped on the outer periphery of rotatable portion 15. Ferrules 18 and 19 are sized to fit around the hose ends so when the couplings are expanded, the hose ends will be sandwiched between the couplings and the ferrules. The hose couplings are attached to the ends of a hose, and the female coupling is simultaneously marked for identification by use of the expansion and marking machine shown in FIGS. 3 through 5.

As shown, the machine includes a female coupling expansion attachment station 20 and a male coupling expansion attachment station 21. Although this two station type of machine is preferred, a single station or three or more stations can be utilized. The unique marking means 60 is attached to the front of the machine.

The machine includes frame 30 with hydraulic or air cylinder 31 mounted on top thereof. A pair of guides 32 are mounted at the front of the machine through apertures 33 in front piece 34.

A bellcrank assemby 40 is mounted at the rear of the machine in operable engagement with cylinder 31 via operating rod 41 (a second operating rod 70 can be attached to drive crank 42 for manual operation of the machine.) Bellcrank assembly 40 includes drive crank 42 which is operably connected to operating rod 41 by clevis 43 and clevis pin 44. A bellcrank axle 45 is provided through the lower portion of drive crank 42, and a pair of bellcranks 46 are mounted on each end of axle 45. At the free end of each bellcrank 46, a mandrel-slide-toggle assembly is mounted (only one shown in FIG. 4) which includes toggle 47, slide 48 and tapered mandrel 49. Clevis pins 44 are used to connect toggle 47 to bellcrank 46 and to slide 48. Tapered mandrel 49 preferably has a threaded end which is threadably received in the proximal end of slide 48. The slides 48 are slidable through the axial bores in guides 32 with tapered mandrels 49 protruding form the ends of guides 32.

Mounting plate 50 is mounted to front piece 34 by means of guide pins 51 and has a pair of bores therein through which the threaded external ends of guides 32 pass. Guides 32 are then secured to mounting plate 50 by means of nuts 52.

Finally, expansion finger assemblies are mounted to the ends of guides 32. The expansion finger assemblies includes holders 53 which are threaded onto the ends of guides 32, expansion fingers 54 and retainers 55 which are secured to holders 53 to hold fingers 54 in place by means of screws 56. The station to be used for attaching the female couplings also has stamp arbor 57 installed between retainer 55 and holder 53, with the arbor protruding in front of retainer 44 and around expansion fingers 54.

The marking means assembly 60 is mounted to the front of the machine to mounting plate 50 by means of riser guides 61 which are bolted to mounting plates 50. Moveable marking stamp arm 62 is slidably received in the notched ends of riser guides 61 and has a rigidly attached marking stamp 63 mounted on the top thereof. The location of riser guides 61 on mounting plate 50 should be such that marking stamp 63 passes through a marking engagement position with female coupling end 15 when it is placed over stamp arbor 57. Riser covers 64 are used to maintain stamp arm 62 in the slide notches of riser guides 61. Connecting links 65 are attached to each end of stamp arm 62 with the lower ends thereof being attached to opposite ends of an actuation rod 66 of an air or hydraulic cylinder 67, which is mounted to the lower end of mounting plate 50.

The operation of the machine is as follows. Ferrules are placed around the ends of a hose and a male coupling and a female coupling are placed in the ends of the hose. The female coupling is then placed over the end of expansion fingers 54 and stamp arbor 57 at station 20 and the male coupling is placed over the other set of expansion fingers 54 at station 21. Upon actuating the machine, cylinder 31 will rotate the bellcrank assembly to urge both tapered mandrels 40 into both sets of expansion fingers 54 causing them to expand to thereby internally expand both hose couplings. Simultaneously, cylinder 67 is actuated to cause stamp arm 62 to move linearly from a nonmarking position to provide the desired marking 17 on the curved periphery of rotatable end 15. Stamp arbor 57 which has an outside diameter slightly less than the inside diameter of rotatable end 15 of female coupling 12 prevents deformation of female coupling end 15 during the marking stage.

For maximum versatility of the machine, stamp arbor 57 can be spring biased so as to be moveable toward the machine so that if it is desired to use that station for attaching a male coupling, the male coupling is urged against the spring biased stamp arbor 57 to push it inwardly to place the male coupling in the proper position for expansion. Because the diameter of the male couplings are less than the diameter of the corresponding female couplings, stamp 63 will not engage the male coupling as is passes through the marking engagement position.

Thus, the machine of the present invention is unique in that it expands and marks hose couplings simultaneously, thus eliminating inventory problems caused by pre-marked couplings. The machine can be constructed as a single station machine or a multiple station machine. In the case of a multiple station machine, the stations can be designed for female couplings or male couplings or both, by the use of a spring biased stamp arbor. In addition, because the marking is done simultaneously with attaching the coupling to a hose, secondary operations of marking the couplings are eliminated with the obvious cost savings.

While the preferred embodiments of the present invention have been described and illustrated, it will be obvious to those skilled in the art that various changes and modifications can be made without departing from the spirit of the present invention. Accordingly, the scope of the present invention is deemed to be limited only by the appended claims.

The embodiments of the invention in which an exclusive property or privilege is claimed are defined as follows:

1. In a hose coupling expansion attachment machine including means for internally expanding a circular cylindrical hose coupling having a rotatable female external end section in the end of a hose to attach it thereto, the improvement which comprises a marking means on the front of said machine adjacent said expanding means so as to be in marking alignment with the curved periphery of said rotatable female external end section of said hose coupling, said marking means being linearly moveable between a non-marking position and a marking engagement position so that as said marking means passes into and through said marking position, said female end section will be rotated to provide the desired marking on the curved periphery of said female end section whereby the marking operation is accomplished simultaneously with the internal expansion of said hose coupling.

2. The improvement according to claim 1 wherein said marking means comprise a linearly movable marking stamp arm having a marking stamp rigidly mounted thereon and means for linearly moving said stamp arm; and wherein said machine includes a rigid hollow circular cylindrical stamp arbor around the machine expanding means sized to be received in said female external end of said hose coupling to prevent deformation of said female external end when said marking stamp passes through said marking engagement position.

3. The improvement according to claim 2 wherein said machine includes two or more expanding means stations.

4. The improvement according to claim 1 wherein said machine includes two or more expanding means stations.

* * * * *